(12) United States Patent
Kim

(10) Patent No.: US 7,391,492 B2
(45) Date of Patent: Jun. 24, 2008

(54) MULTI-DOMAIN LCD DEVICE AND METHOD OF FABRICATING THE SAME

(75) Inventor: Jung Hyun Kim, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 322 days.

(21) Appl. No.: 11/315,094

(22) Filed: Dec. 23, 2005

(65) Prior Publication Data

US 2007/0002236 A1 Jan. 4, 2007

(30) Foreign Application Priority Data

Jun. 30, 2005 (KR) ............ 10-2005-0057629

(51) Int. Cl.
- *G02F 1/1343* (2006.01)
- *G02F 1/1337* (2006.01)
- *G02F 1/13* (2006.01)

(52) U.S. Cl. ............ 349/141; 349/129; 349/187

(58) Field of Classification Search .......... 349/141, 349/129, 42, 43, 46, 47, 75, 128, 144, 187, 349/192

See application file for complete search history.

(56) References Cited

U.S. PATENT DOCUMENTS

| | | | |
|---|---|---|---|
| 6,853,425 B2 * | 2/2005 | Kim et al. | 349/119 |
| 2003/0016310 A1 * | 1/2003 | Lee | 349/43 |
| 2004/0125295 A1 * | 7/2004 | Kim et al. | 349/129 |
| 2005/0196584 A1 * | 9/2005 | Halecki et al. | 428/100 |
| 2007/0002236 A1 * | 1/2007 | Kim | 349/129 |

\* cited by examiner

*Primary Examiner*—Brian M Healy
(74) *Attorney, Agent, or Firm*—Morgan, Lewis & Bockius LLP

(57) ABSTRACT

A multi-domain LCD device includes first and second substrates opposing each other, gate and data lines formed on the first substrate and crossing each other, thereby defining pixel regions, pixel electrodes formed on the first substrate in the pixel regions, each pixel electrode having one or more slits in the pixel region, dielectric patterns formed on the second substrate and spaced apart from the slits, compensation patterns formed below the pixel electrodes corresponding to the dielectric patterns, a concave portion formed on the first substrate below the slits, and a liquid crystal layer filled between the first and second substrates.

20 Claims, 4 Drawing Sheets

MULTI-DOMAIN LCD DEVICE AND METHOD OF FABRICATING THE SAME

This application claims the benefit of the Korean Patent Application No. P2005-57629, filed on Jun. 30, 2005, which is hereby incorporated by reference as if fully set forth herein.

BACKGROUND OF THE INVENTION

1. Field of the Invention

The present invention relates to a liquid crystal display (LCD) device, and more particularly, to a multi-domain LCD device and method of fabricating the same.

2. Discussion of the Related Art

Demands for various display devices have increased with development of an information society. Accordingly, many efforts have been made into research and development of various flat display devices such as liquid crystal displays (LCD), plasma display panels (PDP), electroluminescent displays (ELD), and vacuum fluorescent displays (VFD). Some types of flat display devices have already been incorporated into various equipments.

Among the various flat display devices, liquid crystal display (LCD) devices are most widely used due to advantageous characteristics such as high picture quality, thin profile, light weight, and low power consumption. Accordingly, the LCD devices are considered good substitutes for cathode ray tubes (CRT). In addition to mobile type LCD devices such as a display for a notebook computer, LCD devices have been adapted to function as computer monitors and televisions for receiving and displaying broadcast signals. In order to use LCD devices as general displays for various applications, key characteristics considered are whether the LCD devices can provide a high quality picture, such as high resolution and high luminance having a large-sized screen, while still maintaining light weight, thin profile, and low power consumption.

In general, an LCD device includes a liquid crystal panel for displaying images and a driver circuit for applying a driving signal to the liquid crystal panel. The liquid crystal panel includes first and second glass substrates bonded to each other with space therebetween that is occupied by a liquid crystal layer, usually formed by injection.

The first glass substrate (referred herein as a TFT array substrate) includes a plurality of gate lines arranged along a first direction at fixed intervals, a plurality of data lines arranged along a second direction perpendicular to the first direction at fixed intervals, a plurality of pixel electrodes formed in a matrix arrangement at pixel regions where the gate lines cross the data lines, and a plurality of thin film transistors (TFTs) switched by signals of the gate lines to transfer signals of the data lines to each pixel electrode. The second glass substrate (referred herein as a color filter substrate) includes a black matrix layer that blocks light from regions other than the pixel regions, color filter layers for displaying various colors, and a common electrode for producing the image.

The aforementioned LCD device is driven based on optical anisotropy and polarity characteristics of the liquid crystal layer. Since liquid crystal molecules of the liquid crystal layer are thin and long, the liquid crystal molecules have particular alignment characteristics. An alignment direction of the liquid crystal molecules is controlled by an induced electric field applied thereto. Accordingly, light irradiated through the liquid crystal layer may be controlled by altering the alignment direction of the liquid crystal molecules, thereby displaying an image.

FIG. 1 illustrates a plane view illustrating a multi-vertical alignment (MVA) mode LCD device according to a related art, and FIG. 2 illustrates a structural sectional view taken along line I~I' of FIG. 1. As shown in FIG. 1 and FIG. 2, a lower substrate 10 of the related art MVA mode LCD device includes a plurality of gate lines 11 arranged along a first direction, a plurality of data lines 12 arranged along a second direction perpendicular to the first direction at fixed intervals to define pixel regions, a thin film transistor (TFT) array 16 including thin film transistors formed at regions where the gate lines cross the data lines, and pixel electrodes 13 formed in the pixel regions, having one or more slits 15 spaced apart from one another at a predetermined interval.

An upper substrate 20 of the related art MVA mode LCD device includes a black matrix layer (not shown) to cover portions other than the pixel regions, R/G/B (red/green/blue) color filter layers 22 formed corresponding to the pixel regions, and a common electrode 23 formed on an entire surface of the upper substrate including the color filter layers 22. Boss shaped dielectric patterns 21 are formed on opposing sides of the slits 15.

In the related art MVA mode LCD device, liquid crystal molecules 30 having negative dielectric anisotropy is used. When voltages are applied to the related art MVA mode LCD device, an electric field is formed between the common electrode 23 and the pixel electrode 13. The liquid crystal molecules 30 are aligned in accordance with the electric field. Thus, the liquid crystal molecules 30 are aligned obliquely to a horizontal plane as shown in FIG. 2. Distortion of the electric field occurs between the upper and lower substrates 20 and 10 as the dielectric patterns 21 and the slits 15 are interposed between the substrates. The electric field formed is represented as dotted lines along the equivalent potential as shown in FIG. 2. The liquid crystal molecules 30 are aligned in a direction transverse to the equivalent potential lines. Accordingly, the slits 15 and the dielectric patterns 21 serve as the boundary between domains where the alignment direction of the liquid crystal molecules is varied.

FIG. 3 is a graph illustrating transmittance per portions of elements shown in FIG. 2. As shown in FIG. 2, the liquid crystal molecules 30 are aligned by the slits 15 and the dielectric patterns 21 without rubbing. When the driving voltage is applied to the pixel electrode 13, the electric field is not normally formed in a portion corresponding to the slits 15. For this reason, the liquid crystal molecules 30 are not aligned. The liquid crystal molecules 30 are confined in a portion corresponding to the dielectric patterns 21 due to distortion of the electric field. As a result, regions around the slits 15 and the dielectric patterns 21 have low transmittance. These low transmittance portions deteriorate luminance.

Furthermore, the slits 15 and dielectric patterns 21 may each have a small width to prevent reduction of transmittance. However, in this case, the electric field effect per domain is suppressed to reduce transmittance of the whole LCD panel and response characteristics of the liquid crystal layer. Therefore, the slits and dielectric patterns have fixed minimum widths.

SUMMARY OF THE INVENTION

Accordingly, the present invention is directed to an LCD device and method of fabricating the same that substantially obviates one or more problems due to limitations and disadvantages of the related art.

An object of the present invention is to provide a multi-domain LCD device in which transmittance and response characteristics are improved.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a multi-domain LCD device includes first and second substrates opposing each other, gate and data lines formed on the first substrate and crossing each other, thereby defining pixel regions, pixel electrodes formed on the first substrate in the pixel regions, each pixel electrode having one or more slits in the pixel region, dielectric patterns formed on the second substrate and spaced apart from the slits, compensation patterns formed below the pixel electrodes corresponding to the dielectric patterns, a concave portion formed on the first substrate below the slits, and a liquid crystal layer filled between the first and second substrates.

In another aspect, a method of fabricating a multi-domain LCD device includes forming gate and data lines on a first substrate, the gate and data lines arranged to cross each other, thereby defining pixel regions, forming pixel electrodes on the first substrate in the pixel regions, each pixel electrode having one or more slits in the pixel region, forming dielectric patterns on a second substrate, the dielectric patterns spaced apart from the slits, forming compensation patterns below the pixel electrodes corresponding to the dielectric patterns, forming a concave portion on the first substrate below the slits, and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
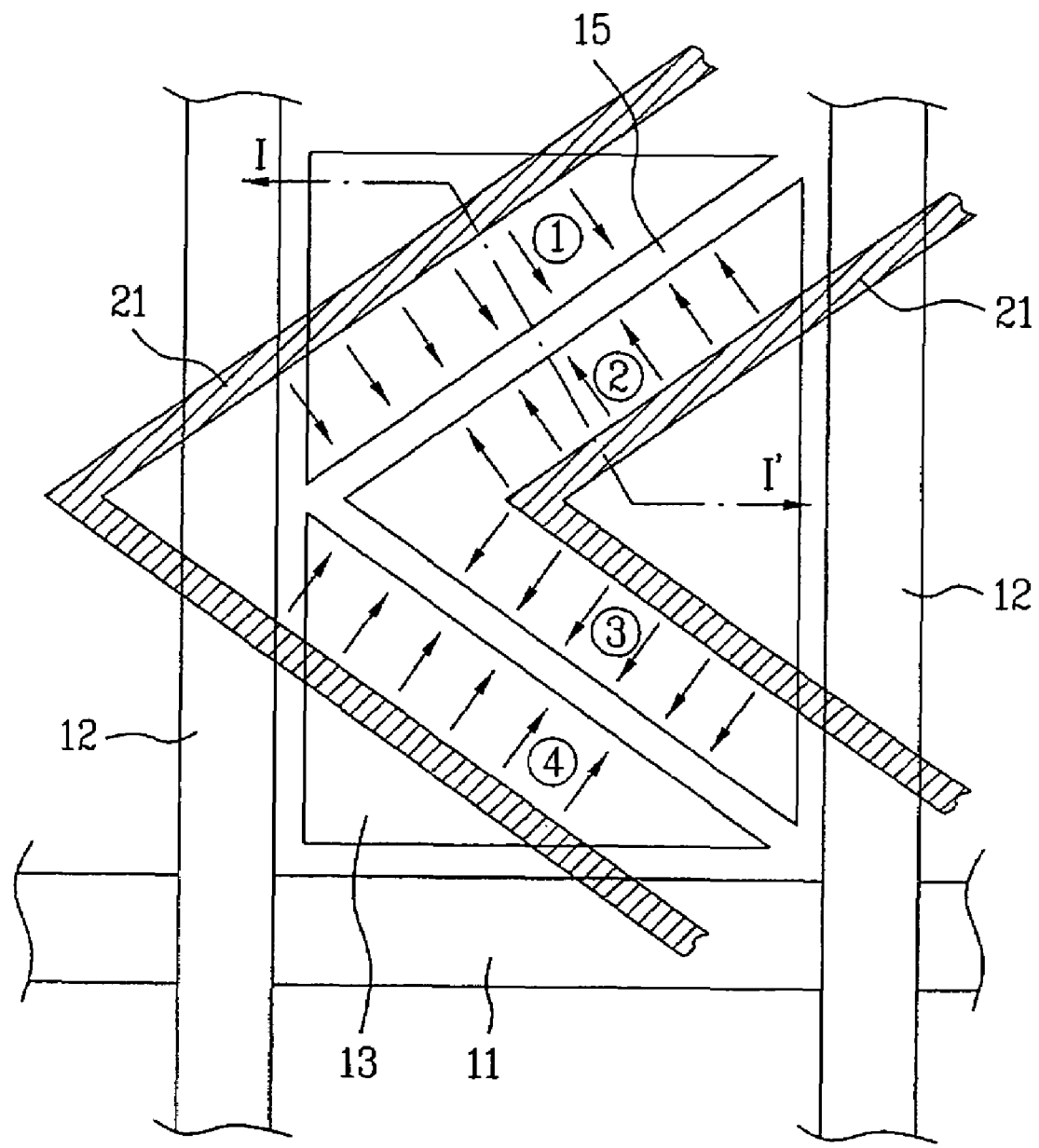
FIG. 1 is a plane view illustrating a related art MVA mode LCD device.
Figure 2:
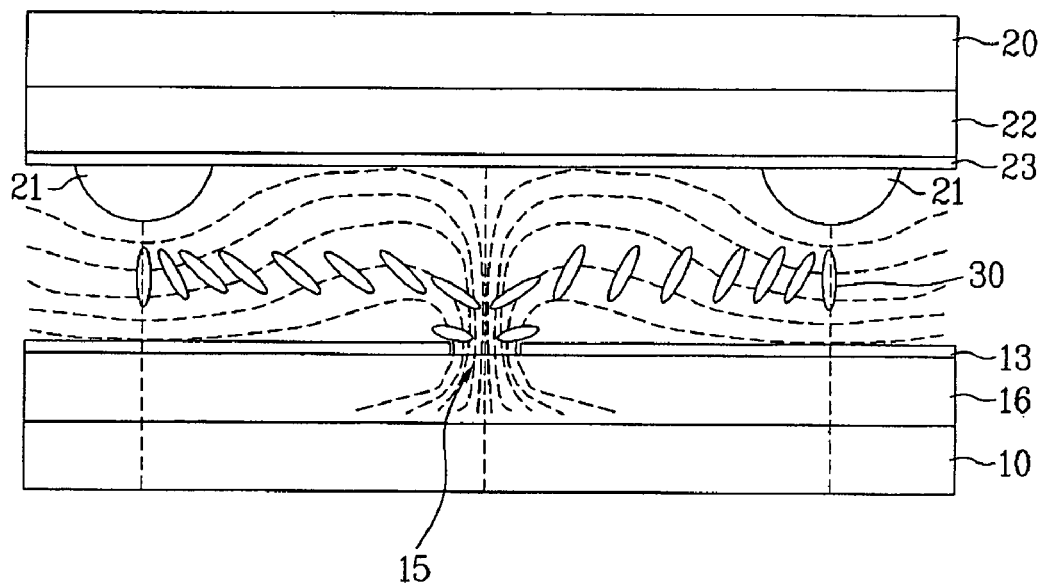
FIG. 2 is a structural sectional view taken along line I~I' of FIG. 1.
Figure 3:
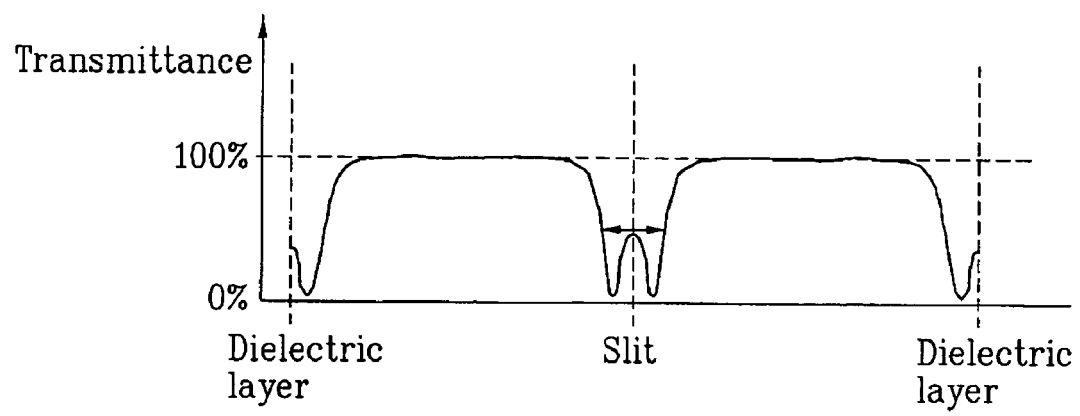
FIG. 3 is a graph illustrating transmittance per portions of elements shown in FIG. 2.
Figure 4:
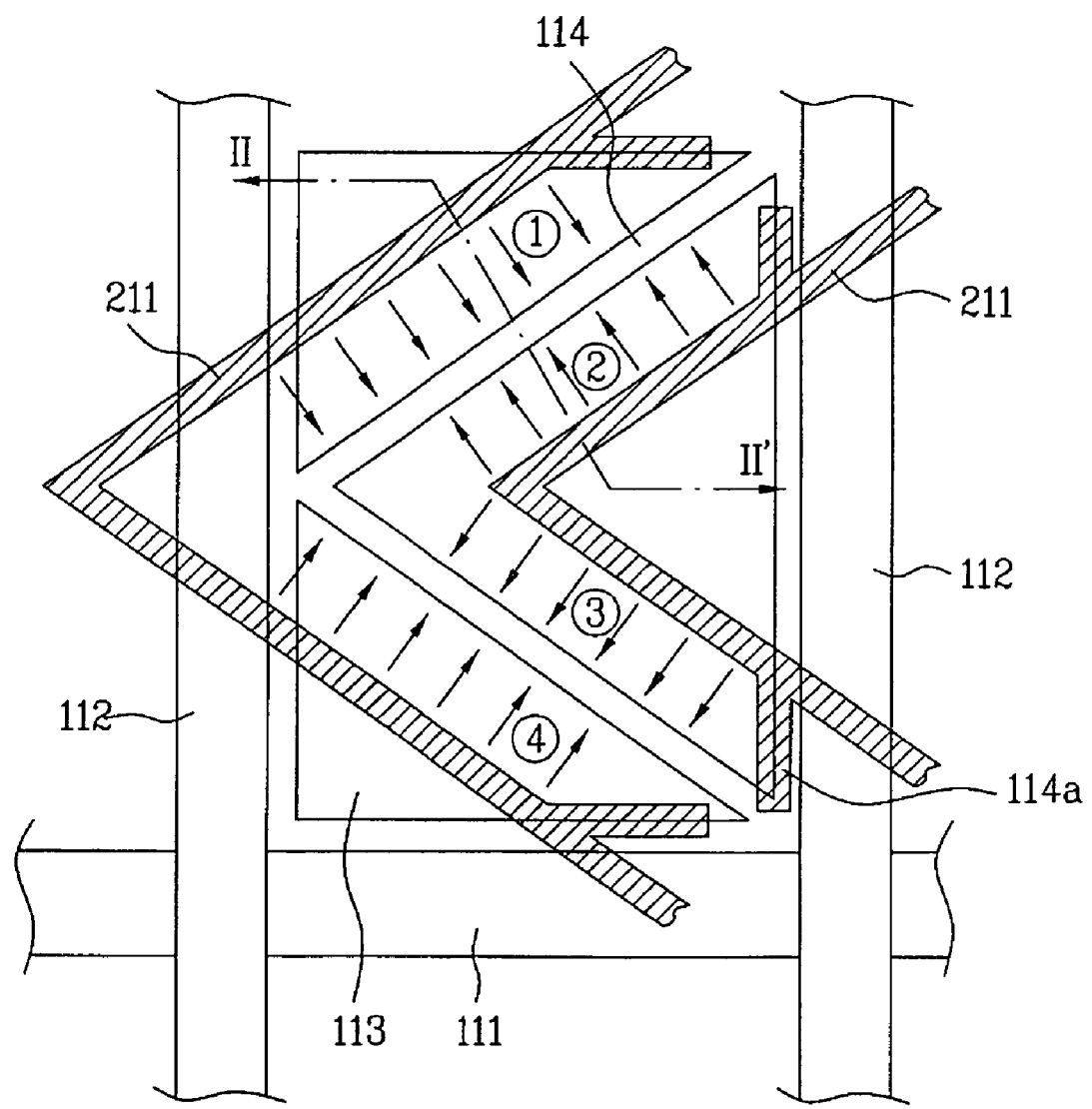
FIG. 4 is a plane view illustrating a multi-domain LCD device according to the present invention.
Figure 5:
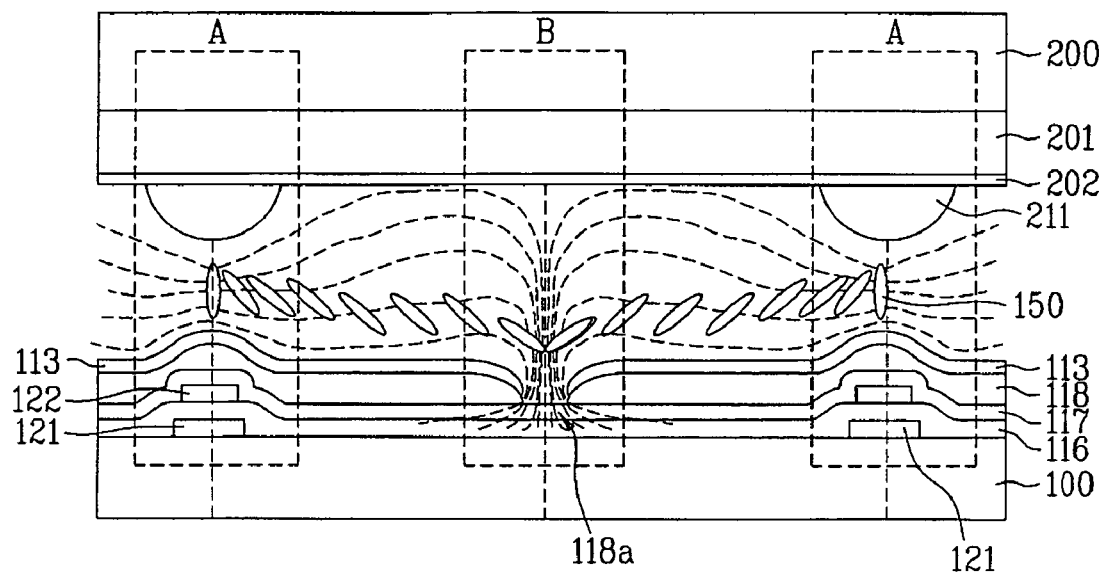
FIG. 5 is a structural sectional view taken along line II~II' of FIG. 4.
Figure 6:
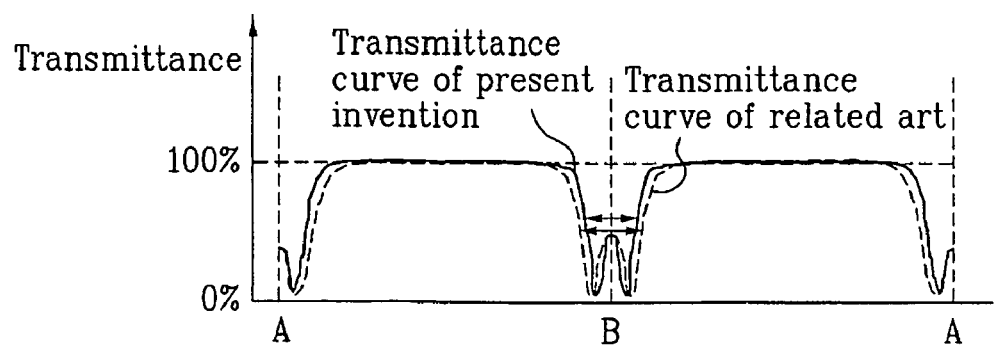
FIG. 6 is a graph illustrating transmittance per portions of elements shown in FIG. 5.

FIG. 4 illustrates a plane view of a multi-domain LCD device according to an exemplary embodiment of the present invention. FIG. 5 illustrates a structural sectional view taken along line II~II' of FIG. 4, and FIG. 6 is a graph representing transmittance per portions of elements shown in FIG. 5.

As shown in FIG. 4 and FIG. 5, the multi-domain LCD device according to an exemplary embodiment of the present invention includes first and second substrates 100 and 200 opposing each other, gate and data lines 111 and 112 arranged on the first substrate 100 and cross each other so as to define pixel regions, a pixel electrode 113 formed in the pixel regions on the first substrate 100 and having at least one slit 114, dielectric patterns 211 formed on the second substrate 200 and spaced apart from the slit 114, and a liquid crystal layer 150 filled between the first and second substrates 100 and 200. Additionally, first and second compensation patterns 121 and 122 are formed at a portion on the first substrate 100 corresponding to the dielectric patterns 211, and a concave portion 118a is formed below the slit 114 by removing portions of a second interlayer insulating film 118 formed on the first substrate 100.

The slit 114 and the dielectric patterns 211 in each pixel region have a "V" shape and are formed parallel with each other. The dielectric patterns 211 are provided with extensions 114a formed to surround the boundary of the pixel region. The liquid crystal layer 150 has negative dielectric anisotropy.

The first compensation pattern 121 is formed on the first substrate 100 at a portion corresponding to the dielectric patterns 211 in the same layer as the gate line 111. The first compensation pattern 121 has a width equal to or smaller than that of the dielectric patterns 211. A gate insulating film 116 is formed on an entire surface including the gate line 111 and the first pattern 121.

The second pattern 122 is formed at a portion corresponding to the first pattern 121 on the gate insulating film 116 in the same layer as the data line 112. The second compensation pattern 122 may have a width equal to or smaller than that of the dielectric patterns 211. A first interlayer insulating film 117 is formed on the entire surface of the gate insulating film 116 to cover the data line 112 and the second pattern 122.

A second interlayer insulating film 118 is formed on the first interlayer insulating film 117. The concave portion 118a is formed by removing portions of the second interlayer insulating film 118 corresponding to the slit 114. The pixel electrode 113 is formed on the second interlayer insulating film 118. During a patterning process for forming the pixel electrode 113, the slit 114 is defined by the concave portions of 118a.

Various alternatives may be made to the exemplary embodiment of the present invention without departing from the scope of the invention. For instance, the first and second interlayer insulating films 117 and 118 may be formed as one layer. Accordingly, the concave portion 118a may be formed by etching portions of layer 118 as explained above or by partially etching a top portion of the layer if one layer is formed. Alternatively, the concave portion 118a may be formed by etching portions of both the first and second interlayer insulating films 117 and 118.

In the exemplary embodiment of the present invention, the first and second compensation patterns 121 and 122 are formed having an island shape in the same layer as the gate line 121 and the data line 122, respectively, to narrow a distortion portion using a step difference created by the compensation patterns regardless of a voltage signal applied to the gate line 121 or the data line 122. Accordingly, either the first compensation pattern 121 or the second compensation pattern 122 may be omitted without departing from the scope of the present invention. Furthermore, the gate insulating film 116 may also be omitted between the first and second patterns 121 and 122.

The second substrate 200 includes a black matrix layer (not shown) to cover portions other than the pixel regions, R/G/B color filter layers 201 formed corresponding to the pixel regions, and a common electrode 202 formed on an entire surface including the color filter layers 201. The dielectric patterns 211 having a boss shape are formed on opposing sides of the slit 114 formed between the pixel electrodes 113.

The multi-domain LCD device according to the exemplary embodiment of the present invention has a step difference formed in the second interlayer insulating film 118 and the pixel electrode 113 resulting from the shapes of the first and second patterns 121 and 122. Accordingly, the electric field distortion is limited to a portion near the step difference below the dielectric patterns 211. Because this portion is narrower than that of the related art, low transmittance portion is reduced, thereby increasing transmittance, as shown in FIG. 6. Furthermore, response speed of the liquid crystal molecules is also improved. Therefore, the exemplary embodiment of the present invention allows improvement of transmittance without reducing the electric field effect since the width of the slit 114 or the dielectric patterns 211 is not reduced, thereby improving luminance of the whole panel.

Additionally, because the compensation patterns are formed in the same layer as the gate line and/or the data line, and the insulating film is partially removed to form the concave portions during the process of forming the TFTs, transmittance is improved without requiring separate fabrication processes.

In the aforementioned exemplary embodiment of the present invention, the multi-vertical alignment (MVA) mode LCD device has been described. However, a patterned vertical alignment (PVA) mode, in which a slit is formed at a common electrode, may be used in accordance with the present invention. In this case, a concave portion is formed in an insulating film of a second substrate (upper substrate) corresponding to the slit of the common electrode to obtain substantially the same effect as detailed above in connection with the MVA mode LCD.

It will be apparent to those skilled in the art that various modifications and variations can be made in the multi-domain LCD device of the present invention and the method of fabricating the same without departing form the spirit or scope of the invention. Thus, it is intended that the present invention cover the modifications and variations of this invention provided they come within the scope of the appended claims and their equivalents.

What is claimed is:

1. A multi-domain LCD device, comprising:
   first and second substrates opposing each other;
   gate and data lines formed on the first substrate and crossing each other, thereby defining pixel regions;
   pixel electrodes formed on the first substrate in the pixel regions, each pixel electrode having one or more slits in the pixel region;
   dielectric patterns formed on the second substrate and spaced apart from the slits;
   compensation patterns formed below the pixel electrodes corresponding to the dielectric patterns;
   a concave portion formed on the first substrate below the slits; and
   a liquid crystal layer filled between the first and second substrates.

2. The device according to claim 1, wherein the slits and the dielectric patterns are formed in the same direction.

3. The device according to claim 1, wherein the dielectric patterns include extensions formed to surround the boundary of the pixel regions.

4. The device according to claim 1, wherein the liquid crystal layer has liquid crystal molecules having negative dielectric anisotropy.

5. The device according to claim 1, further comprising one or more insulating films below the pixel electrode on the first substrate.

6. The device according to claim 5, wherein the insulating films corresponding to the position of the slits are removed to form the concave portion.

7. The device according to claim 1, wherein the compensation patterns are formed of metal.

8. The device according to claim 7, wherein the compensation patterns are formed in the same layer as the gate lines.

9. The device according to claim 7, wherein the compensation patterns are formed in the same layer as the data lines.

10. The device according to claim 7, wherein the compensation patterns are comprised of a first metal layer formed in the same layer as the gate lines and a second metal layer formed in the same layer as the data lines.

11. The device according to claim 10, further comprising an insulating film interposed between the first and second metal layers.

12. The device according to claim 1, wherein the pixel electrode includes a step difference defined by the compensation patterns.

13. A method of fabricating a multi-domain LCD device, comprising:
    forming gate and data lines on a first substrate, the gate and data lines arranged to cross each other, thereby defining pixel regions;
    forming pixel electrodes on the first substrate in the pixel regions, each pixel electrode having one or more slits in the pixel region;
    forming dielectric patterns on a second substrate, the dielectric patterns spaced apart from the slits;
    forming compensation patterns below the pixel electrodes corresponding to the dielectric patterns;
    forming a concave portion on the first substrate below the slits; and
    forming a liquid crystal layer between the first and second substrates.

14. The method according to claim 13, wherein the dielectric patterns include extensions formed to surround the boundary of the pixel regions.

15. The method according to claim 13, further comprising forming one or more insulating formed below the pixel electrode on the first substrate.

16. The method according to claim 15, wherein the insulating films corresponding to the position of the slits are removed to form the concave portion.

17. The method according to claim 13, wherein the compensation patterns and the gate lines are formed in the same process step.

18. The method according to claim 13, wherein the compensation patterns and the data lines are formed in the same process step.

19. The method according to claim 13, wherein first compensation patterns are formed when the gate lines are formed and second compensation patterns formed when the data lines are formed.

20. The method according to claim 19, further comprising forming an interlayer insulating film between the first and second compensation patterns.

* * * * *